US011654069B2

(12) United States Patent
Bolin

(10) Patent No.: US 11,654,069 B2
(45) Date of Patent: May 23, 2023

(54) SYSTEMS FOR MONITORING PERSON LIFTING DEVICES USING LOAD TENSION PINS

(71) Applicant: Liko Research & Development AB, Luleå (SE)

(72) Inventor: Andreas Bolin, Gammmelstad (SE)

(73) Assignee: Liko Research & Development AB, Luleå (SE)

(*) Notice: Subject to any disclaimer, the term of this patent is extended or adjusted under 35 U.S.C. 154(b) by 91 days.

(21) Appl. No.: 17/374,126

(22) Filed: Jul. 13, 2021

(65) Prior Publication Data

US 2021/0338508 A1 Nov. 4, 2021

Related U.S. Application Data

(62) Division of application No. 15/967,973, filed on May 1, 2018, now Pat. No. 11,096,852.

(60) Provisional application No. 62/513,711, filed on Jun. 1, 2017.

(51) Int. Cl.
*A61G 7/10* (2006.01)
*G01L 5/00* (2006.01)
*H04W 4/80* (2018.01)
*H04W 4/02* (2018.01)

(52) U.S. Cl.
CPC ......... *A61G 7/1065* (2013.01); *A61G 7/1017* (2013.01); *G01L 5/0033* (2013.01); *G01L 5/0071* (2013.01); *A61G 7/1061* (2013.01); *A61G 2203/32* (2013.01); *A61G 2203/74* (2013.01); *H04W 4/02* (2013.01); *H04W 4/80* (2018.02)

(58) Field of Classification Search
CPC .. A61G 7/1065; A61G 7/1017; A61G 7/1061; A61G 2203/32; A61G 2203/74; G01L 5/0071; G01L 5/0033; H04W 4/02; H04W 4/80
See application file for complete search history.

(56) References Cited

U.S. PATENT DOCUMENTS 4,869,266 A * 9/1989 Taylor ..................... A61M 1/00
  600/587
4,944,056 A * 7/1990 Schroeder ............ A61G 7/1015
  5/85.1
5,809,591 A * 9/1998 Capaldi ................ A61G 7/1015
  5/83.1
6,047,418 A * 4/2000 Seide ................... A61G 7/1015
  5/81.1 R (Continued)

OTHER PUBLICATIONS

Futek Advanced Sensor Technology, Application 123—Medical Patient Lift, accessed Nov. 22, 2016.

*Primary Examiner* — Eric J Kurilla
(74) *Attorney, Agent, or Firm* — Dinsmore & Shohl LLP

(57) ABSTRACT

A multi-link device includes a load tension pin including a sensor configured to measure tension applied to the load tension pin, network interface hardware, one or more processors, and one or more memory modules storing computer readable and executable instructions which, when executed by the one or more processors, cause the multi-link device to: determine whether the tension measured by the load tension pin exceeds a threshold value; and transmit, by the network interface hardware, load event data to a receiver in response to determination that the tension exceeds the threshold value.

7 Claims, 12 Drawing Sheets

(56) References Cited

U.S. PATENT DOCUMENTS

| | | | | |
|---|---|---|---|---|
| 6,329,612 | B1* | 12/2001 | von Schroeter | A61G 7/1019 177/144 |
| 7,462,138 | B2* | 12/2008 | Shetty | A61H 3/008 482/51 |
| 7,634,824 | B2* | 12/2009 | Gramkow | A61G 7/1015 5/81.1 R |
| 7,827,630 | B2* | 11/2010 | Bostelman | A61G 7/1007 5/87.1 |
| 8,104,115 | B2 | 1/2012 | Gramkow et al. | |
| 8,474,794 | B2* | 7/2013 | Liljedahl | A61G 7/1063 254/120 |
| 8,538,710 | B2 | 9/2013 | Todd et al. | |
| 8,910,325 | B2 | 12/2014 | Faucher et al. | |
| 9,839,569 | B2* | 12/2017 | Behnke | A61G 7/1049 |
| 2005/0115914 | A1* | 6/2005 | Chepurny | A61G 7/1042 212/328 |
| 2010/0224841 | A1 | 9/2010 | Liljedahl | |
| 2012/0000876 | A1* | 1/2012 | Bergenstrale | B66C 7/02 212/336 |
| 2012/0325586 | A1* | 12/2012 | Meggs | A61G 7/1042 182/231 |
| 2013/0319775 | A1* | 12/2013 | Ngoh | G01G 19/52 177/1 |
| 2014/0020175 | A1 | 1/2014 | Dixon et al. | |
| 2014/0206503 | A1 | 7/2014 | Stockmaster et al. | |
| 2015/0107020 | A1 | 4/2015 | Andersson et al. | |
| 2017/0326013 | A1* | 11/2017 | Hyde | A61B 5/6805 |
| 2018/0235822 | A1* | 8/2018 | Wako | A61G 7/0527 |
| 2020/0183362 | A1* | 6/2020 | Ledwith | A61G 7/1065 |
| 2020/0377347 | A1* | 12/2020 | Strassle | A61G 7/1042 |

* cited by examiner

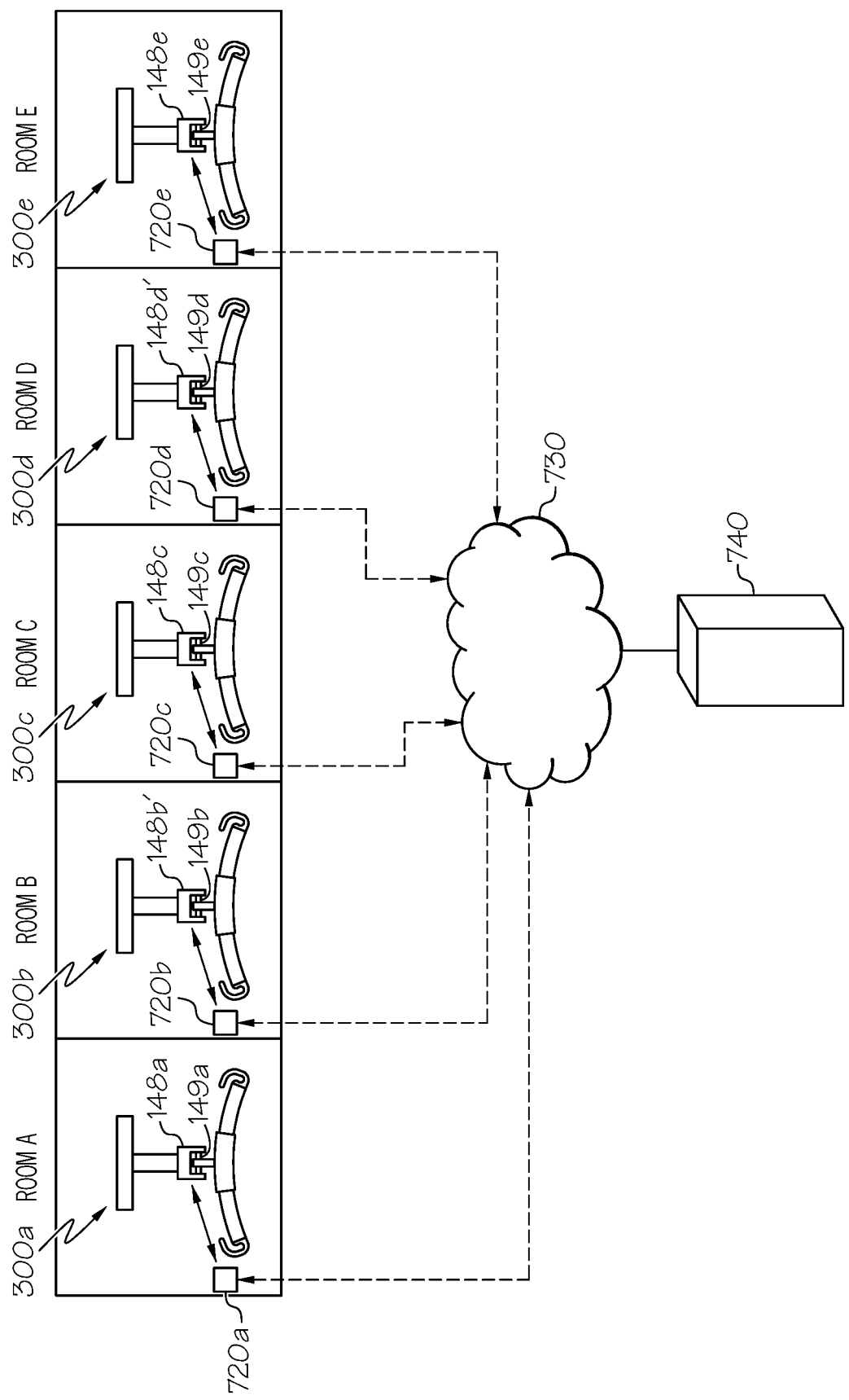

SYSTEMS FOR MONITORING PERSON LIFTING DEVICES USING LOAD TENSION PINS

CROSS-REFERENCE TO RELATED APPLICATIONS

This application is a divisional of U.S. patent application Ser. No. 15/967,973 filed on May 1, 2018, which claims priority to U.S. Provisional Application No. 62/513,711 filed on Jun. 1, 2017, the entire contents of which are incorporated herein by reference.

BACKGROUND

Field

The present specification generally relates to systems for monitoring person lifting devices, such as person lifting devices including mobile lifts and/or overhead lifts and, more particularly, to systems for monitoring person lifting devices having load tension pins that wirelessly communicate load information to a server.

Technical Background

Person lifting devices, such as mobile lifts and/or overhead lifts, may be used in hospitals, other health care facilities, and sometimes in home care settings to move a person from one location to another or to assist the person in moving. Conventional person lifting devices utilize various accessories that attach to the person lifting device. For example, a sling or other attachment may secure a person to the lifting device and to an actuator to lift the person to a higher elevation or lower the person to a lower elevation. In one typical example the caregiver operates the actuator to raise the patient off a bed, repositions the person by moving the lifting device to a desired location, and then operates the actuator again to lower the patient to the destination.

Information about how many times and how long person lifting devices are used is important to track. Accordingly, a need exists for monitoring the usage of person lifting devices in real time.

SUMMARY

In one embodiment, a multi-link device includes a load tension pin including a sensor configured to measure tension applied to the load tension pin, network interface hardware, one or more processors, and one or more memory modules storing computer readable and executable instructions which, when executed by the one or more processors, cause the multi-link device to: determine whether the tension measured by the load tension pin exceeds a threshold value; and transmit, by the network interface hardware, load event data to a receiver in response to determination that the tension exceeds the threshold value.

In another embodiment, a person lift device includes an actuator, a lift arm coupled to the actuator, and a multi-link device coupled to one end of the lift arm. The one end of the lift arm is configured to move vertically by the actuator. The multi-link device includes a load tension pin including a sensor configured to measure tension applied to the load tension pin, network interface hardware, one or more processors, and one or more memory modules storing computer readable and executable instructions which, when executed by the one or more processors, cause the multi-link device to: determine whether the tension measured by the load tension pin exceeds a threshold value, and transmit, by the network interface hardware, load event data to a receiver in response to determination that the tension exceeds the threshold value. The person lift device also includes a bar attached to the load tension pin.

In yet another embodiment, a lift data management system includes a receiver, a person lifting device, and a central server communicatively coupled to the receiver. The person lifting device includes an actuator, a lift arm coupled to the actuator, one end of the lift arm being configured to move vertically by the actuator, and a multi-link device coupled to the one end of the lift arm and communicatively coupled to the receiver. The multi-link device includes a load tension pin including a sensor configured to measure tension applied to the load tension pin, first network interface hardware, one or more processors, and one or more memory modules storing computer readable and executable instructions which, when executed by the one or more processors, cause the multi-link device to: determine whether the tension measured by the load tension pin is increased; and transmit, by the first network interface hardware, load event data to the receiver in response to determination that the tension is increased. The central server includes second network interface hardware configured to receive load event data from the receiver, one or more processors, and one or more memory modules storing usage information associated with the person lifting device and computer readable and executable instructions which, when executed by the one or more processors, cause the multi-link device to update the usage information based on the load event data.

Additional features of the person lifting devices and scale assemblies for person lifting devices and methods for operating the same described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 12 depicts collecting load information from a plurality of multi-link devices and a plurality of receivers in accordance with one or more embodiments shown and described herein.

DETAILED DESCRIPTION

Figure 1:
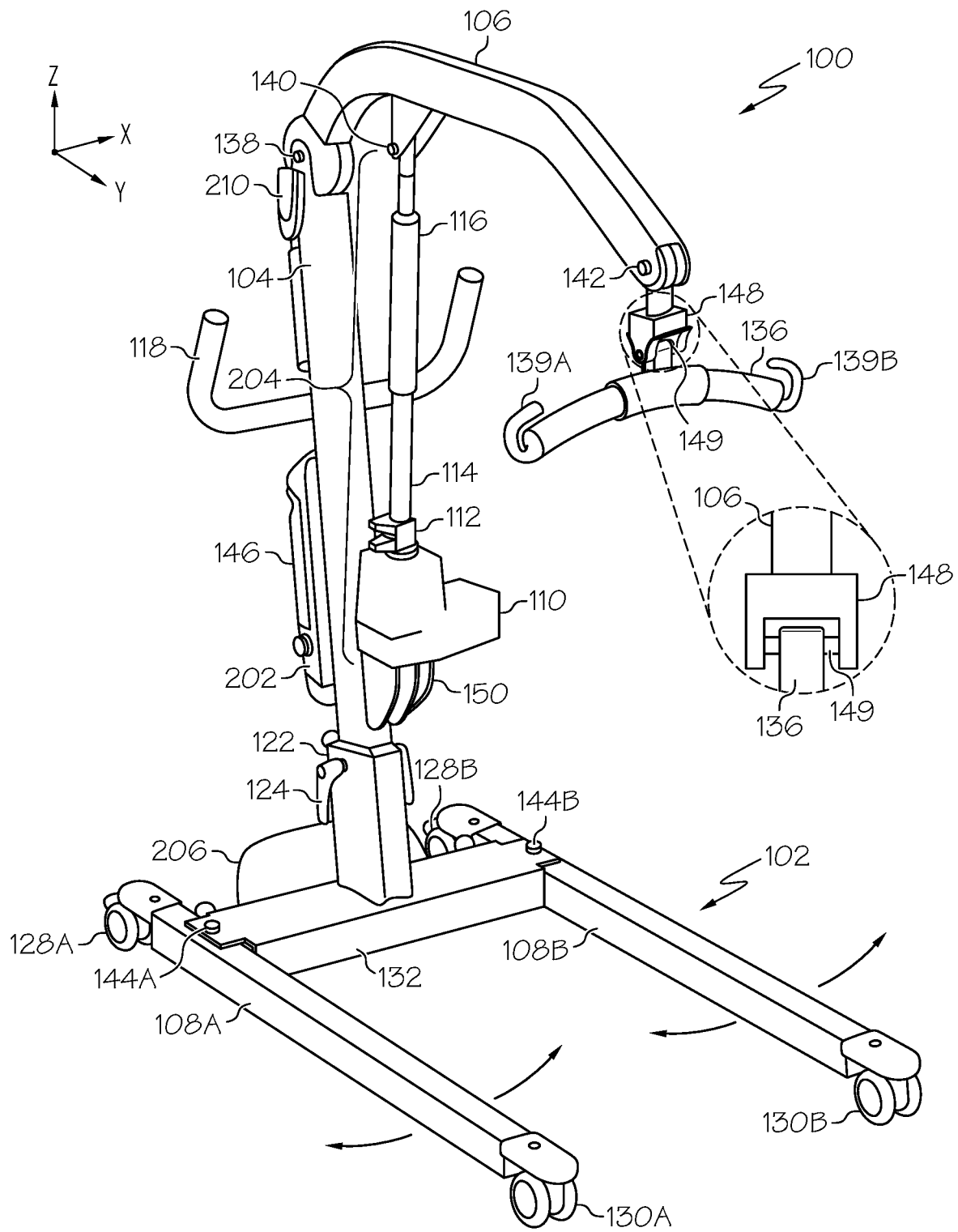
FIG. 1 schematically depicts a front perspective view of a mobile lift according to one or more embodiments shown and described herein.

Reference will now be made in detail to embodiments of lift data management systems, examples of which are illustrated in the accompanying drawings. Whenever possible, the same reference numerals will be used throughout the drawings to refer to the same or like parts. In one embodiment, a multi-link device includes a load tension pin including a sensor configured to measure tension applied to the load tension pin, network interface hardware, one or more processors, and one or more memory modules storing computer readable and executable instructions which, when executed by the one or more processors, cause the multi-link device to: determine whether the tension measured by the load tension pin exceeds a threshold value; and transmit, by the network interface hardware, load event data to a receiver in response to determination that the tension exceeds the threshold value. Various embodiments of person lifting devices including the multi-link device will be described herein with specific reference to the appended drawings.

As used herein, the term "longitudinal direction" refers to the forward-rearward direction of the components of the person lifting devices (i.e., in the +/−Y-direction as depicted). The term "lateral direction" refers to the cross-wise direction of the components of the person lifting devices (i.e., in the +/−X-direction as depicted), and is transverse to the longitudinal direction. The term "vertical direction" refers to the upward-downward direction of the components of the person lifting devices (i.e., in the +/−Z-direction as depicted).

Figure 2:
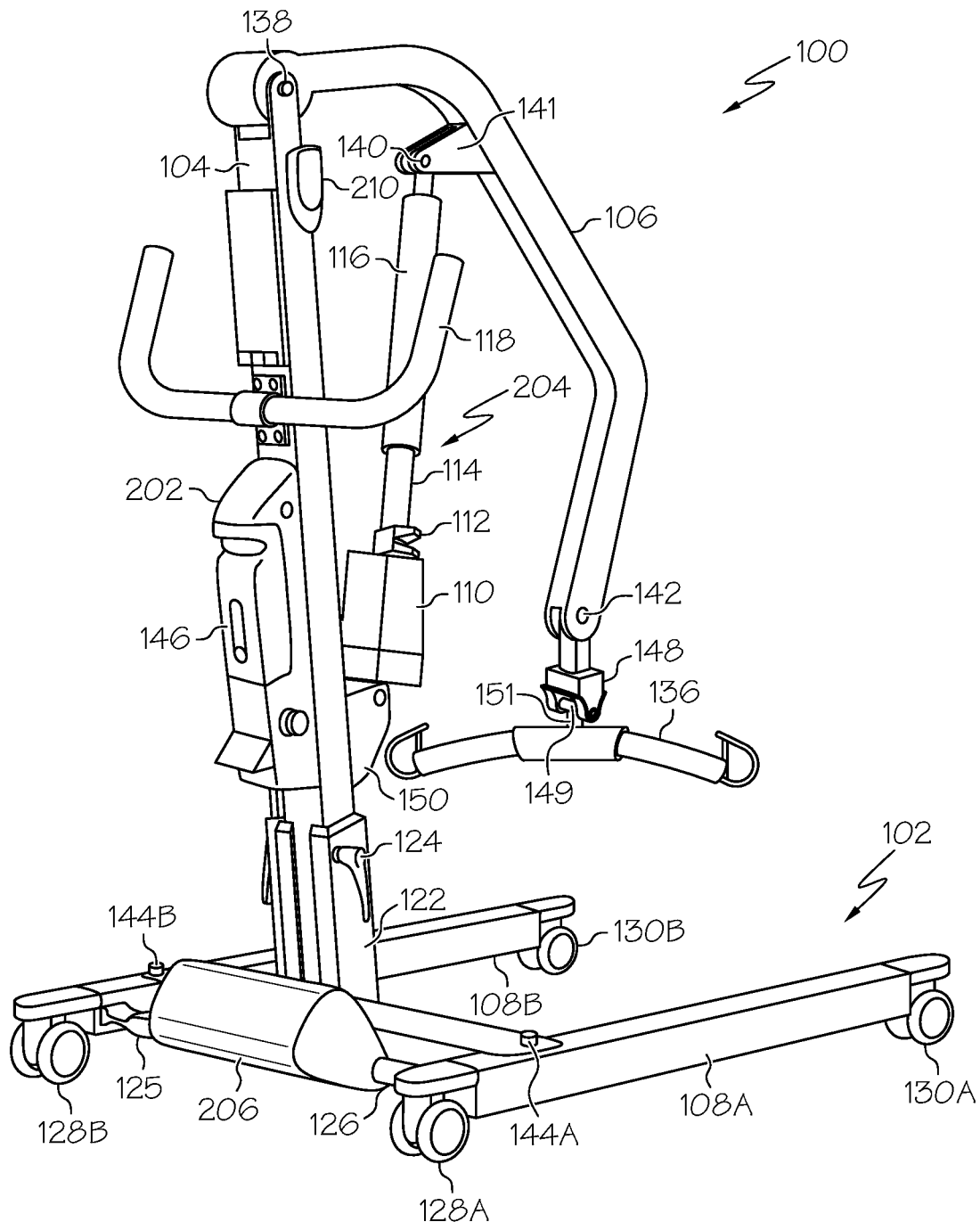
FIG. 2 schematically depicts a rear perspective view of a mobile lift according to one or more embodiments shown and described herein.

Referring now to FIGS. 1 and 2, one embodiment of a person lifting device 100 is schematically illustrated. The person lifting device 100 generally comprises a base 102, a lift mast 104 and a lift arm 106. The base 102 comprises a pair of base legs 108A, 108B which are pivotally attached to a cross support 132 at base leg pivots 144A, 144B such that the base legs 108A, 108B may be pivotally adjusted with respect to the lift mast 104 as indicated by the arrows. The base legs 108A, 108B are pivoted with the base actuator 206 which is mechanically coupled to both base legs 108A, 108B with base motor linkages 125, 126. In one embodiment, the base actuator 206 may comprise a linear actuator such as a motor mechanically coupled to telescoping threaded rods connected to the base motor linkages 125, 126 such that, when an armature of the motor is rotated, one of the threaded rods is extended or retracted relative to the other. For example, in the configuration shown in FIGS. 1 and 2, when the rods are extended, the base legs 108A and 108B are pivoted towards one another and, when the rods are retracted, the base legs 108A and 108B are pivoted away from one another. The base legs 108A, 108B additionally comprise a pair of front casters 130A, 130B and a pair of rear casters 128A, 128B. The rear casters 128A, 128B may comprise caster brakes (not shown).

The base further comprises a mast support 122 disposed on the cross support 132. In one embodiment, the mast support 122 is a rectangular receptacle configured to receive the lift mast 104 of the person lifting device 100. For example, a first end of the lift mast 104 may be adjustably received in the mast support 122 and secured with a pin, threaded fastener, or a similar fastener coupled to the adjustment handle 124. The pin or threaded fastener extends through the mast support 122 and into a corresponding adjustment hole(s) (not shown) on the lift mast 104. Accordingly, it will be understood that the position of the lift mast 104 may be adjusted vertically with respect to the base 102 by repositioning the lift mast 104 in the mast support 122. The lift mast 104 further comprises at least one handle 118 coupled to the lift mast 104. The handle 118 may provide an operator with a grip for moving the person lifting device 100 on the front casters 130A, 130B and the rear casters 128A, 128B. Accordingly, it should be understood that, in at least one embodiment, the person lifting device 100 is mobile.

The person lifting device 100 further comprises a lift arm 106 which is pivotally coupled to the lift mast 104 at the lift arm pivot 138 at a second end of the lift mast 104 such that the lift arm 106 may be pivoted (e.g., raised and lowered) with respect to the base 102. FIG. 1 shows the lift arm 106 in the fully raised position while FIG. 2 shows the lift arm 106 in the fully lowered position. The lift arm 106 comprises at least one sling bar 136 coupled to the lift arm 106 with a multi-link device 148 such that the sling bar 136 is raised or lowered with the lift arm 106. In the embodiment shown in FIGS. 1 and 2, the multi-link device 148 is pivotally attached to the lift arm 106 at an end of the lift arm 106 opposite the lift arm pivot 138. In one embodiment, the multi-link device 148 is pivotally attached to the lift arm 106 at attachment pivot 142 such that the sling bar 136 may be pivoted with respect to the lift arm 106. However, it should be understood that, in other embodiments, the multi-link device 148 may be fixedly attached to the lift arm 106. The multi-link device 148 includes a load tension pin 149 to which the sling bar 136 may be attached. The load tension pin 149 is configured to measure load applied to the load tension pin 149 by the sling bar 136 and/or an object hanging on the sling bar 136, which will be described in detail with reference to FIGS. 9A, 9B, 10A, and 10B below.

In the embodiments described herein, the person lifting device 100 is a mechanized lifting device. Accordingly, raising and lowering the lift arm 106 with respect to the base 102 may be achieved using an actuator such as a lift actuator 204. In the embodiments shown, the lift actuator 204 is a linear actuator which comprises a motor 110 mechanically coupled to an actuator arm 114. More specifically, the motor 110 may comprise a rotating armature (not shown) and the actuator arm 114 may comprise one or more threaded rods coupled to the armature such that, when the armature is rotated, the threaded rods are extended or retracted relative to one another and the actuator arm 114 is extended or retracted. In the embodiment shown in FIG. 1, the lift actuator 204 further comprises a support tube 116 disposed over the actuator arm 114. The support tube 116 provides lateral support (e.g., support in the X and/or Y directions) to the actuator arm 114 as the actuator arm 114 is extended. The lift actuator 204 (and base actuator 206) are coupled to an electronic control unit 202 which facilitates actuation and control of both the lift actuator 204 and the base actuator 206.

In the embodiment shown in FIGS. 1 and 2, the lift actuator 204 is fixedly mounted on the lift mast 104 and pivotally coupled to the lift arm 106. In particular, the lift mast 104 comprises a bracket 150 to which the motor 110 of the lift actuator 204 is attached while the actuator arm 114 is pivotally coupled to the lift arm 106 at the actuator pivot 140. Accordingly, it should be understood that, by actuating the lift actuator 204 with the motor 110, the actuator arm 114 is extended or retracted thereby raising or lowering the lift arm 106 relative to the base 102. In one embodiment, the lift actuator 204 further comprises an emergency release 112. The emergency release 112 facilitates the manual retraction of the actuator arm 114 in the event of a mechanical or electrical malfunction of the lift actuator 204.

While the embodiments described herein refer to the lift actuator 204 as comprising a motor 110 and an actuator arm 114, it will be understood that the actuator may have various other configurations and may include a hydraulic or pneumatic actuator comprising a mechanical pump or compressor, or a similar type of actuator. Further, in other embodiments, where the lifting device is a cable-based lift system, the actuator may be a motor which pays out and/or takes-up cable thereby raising and/or lowering an attached load. Accordingly, it will be understood that various other types of actuators may be used to facilitate raising and lowering the lift arm 106 and/or an attached load with respect to the base 102.

Still referring to FIGS. 1 and 2, the person lifting device 100 further comprises an electronic control unit 202. The electronic control unit 202 comprises a battery 146 and is electrically coupled to the lift actuator 204 and the base actuator 206. The electronic control unit 202 may be operable to receive an input from an operator via a control device coupled to the electronic control unit 202. In some embodiments, the control device comprises a wired controller and/or one or more wireless controllers. For example, in one embodiment, the control device is a wired controller (such as a pendant or the like) or, alternatively, a controller integrated into the electronic control unit 202. In another embodiment, the controller is a wireless controller such as a wireless hand control and/or a wireless diagnostic monitor/control. Based on the input received from the control device, the control unit is programmed to adjust the position of the lift arm 106 and/or the position of the base legs 108A, 108B by sending electric control signals to the lift actuator 204 and/or the base actuator 206. The electronic control unit 202 may communicate with the multi-link device 148 via a wireless or wired connection. For example, the electronic control unit 202 may communicate identification information or location information of the person lifting device 100 to the multi-link device 148.

While FIGS. 1 and 2 depict the person lifting device 100 as a mobile person lift, it should be understood that the lift control systems and methods for operating a person lifting device described herein may be used in conjunction with other person lifting devices having various other configurations including, without limitation, stationary lifting devices and overhead lifting devices. Further, it should also be understood that, while specific embodiments of the person lifting device described herein relate to person lifting devices used for raising and/or lowering patients, the lift control systems described herein may be used with any lifting device which is operable to raise and lower a load.

Figure 3:
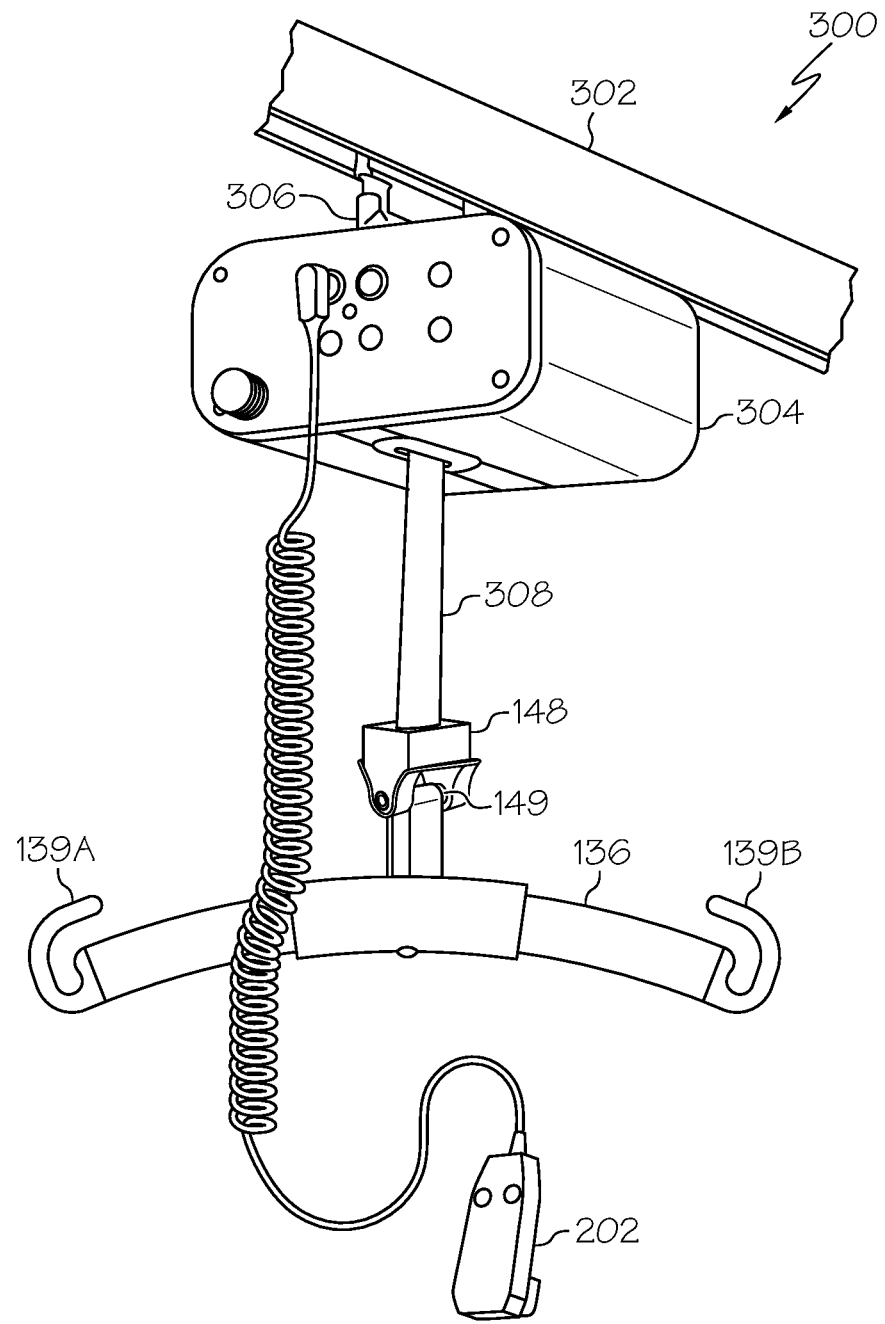
FIG. 3 schematically depicts a perspective view of an overhead lift according to one or more embodiments shown and described herein.

For example, FIG. 3 depicts another embodiment in which the person lifting device 300 is a rail-mounted lift system. In this embodiment, the person lifting device 300 generally comprises a lift unit 304 which is slidably coupled to a rail 302 with a carriage 306. The lift unit 304 may be used to support and/or lift a patient with a lift arm, for example, a lifting strap 308 that is coupled to a lift actuator, in this case a motor, contained within the lift unit 304. The lift actuator facilitates paying-out or taking-up the lifting strap 308 from the lift unit 304 thereby raising and lowering a patient attached to the lifting strap 308. In some embodiments, an end of the lifting strap 308 includes a multi-link device 148 to which a sling bar 136 may be attached. In the embodiments described herein, the lift unit 304 further includes a battery which is housed in the lift unit 304 and electrically coupled to the lift actuator thereby providing power to the lift actuator. However, it should be understood that, in other embodiments, the lift unit 304 may be constructed without the battery, such as when the lift actuator is directly wired to a power source. The person lifting device 300 further includes an electronic control unit 202 which is communicatively coupled to the lift actuator and facilitates actuation and control of the lift actuator, specifically paying out and taking up the lifting strap 308. In some embodiments, the electronic control unit 202 wirelessly communicates with the multi-link device 148. For example, in some embodiments, the electronic control unit 202 communicates identification information or location information of the person lifting device 300 to the multi-link device 148.

In the embodiment of the person lifting device shown in FIG. 3, a person may be attached to the lifting strap 308 with a sling bar 136 attached to the lifting strap 308. For example, the sling bar 136 may be attached to a harness or sling in which the person is positioned to facilitate the lifting operation. The lift unit 304 may be actuated with the electronic control unit 202 to pay out or take up the lifting strap 308 from the lift unit 304. In the embodiment shown in FIG. 3, the electronic control unit 202 is directly wired to the lift unit 304. However, it should be understood that, in other embodiments, the electronic control unit 202 may be wirelessly coupled to the lift unit 304 to facilitate remote actuation of the lift unit 304.

Figure 4:
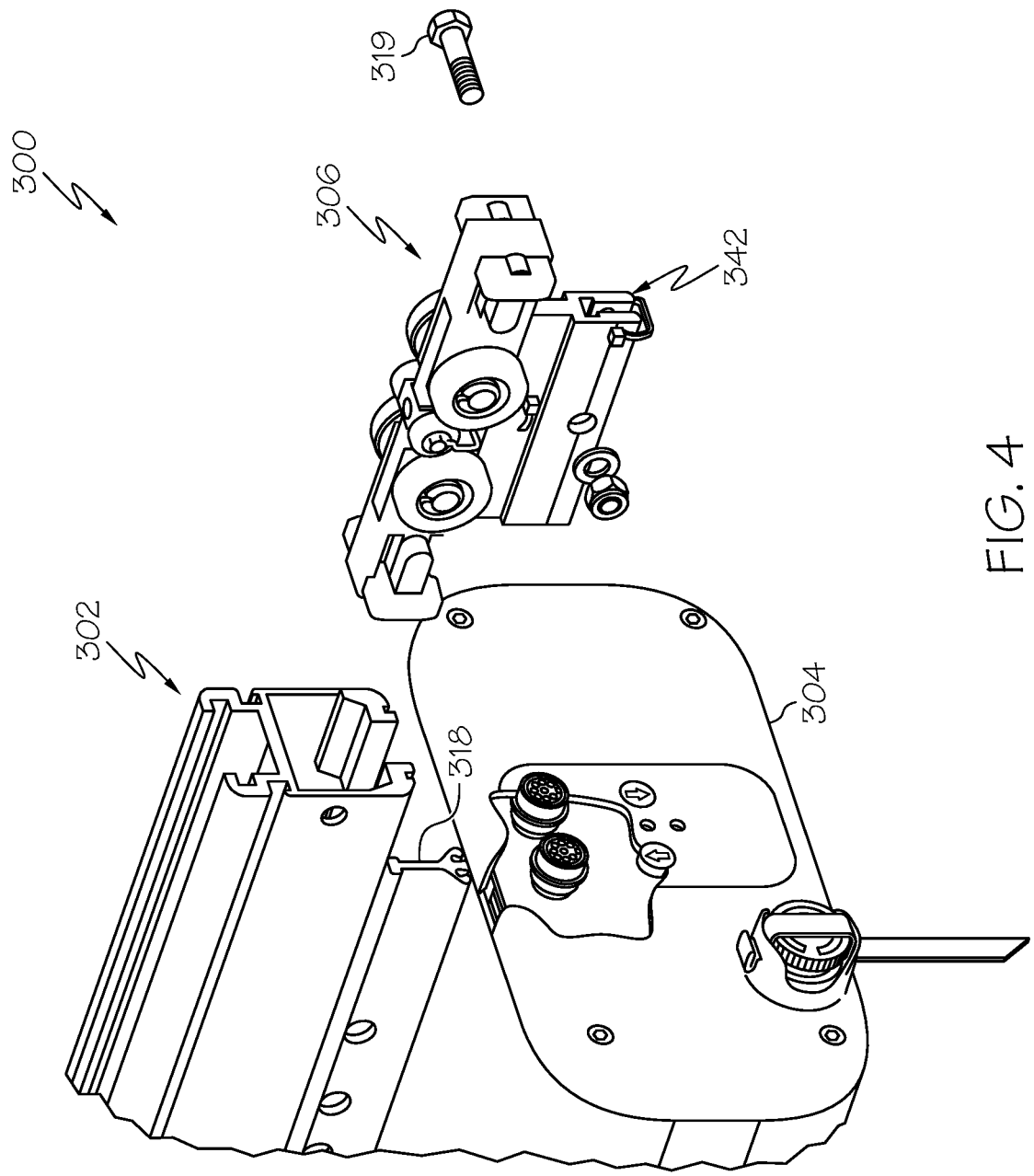
FIG. 4 schematically depicts an exploded view of the overhead lift of FIG. 3.

Referring now to the exploded view of the person lifting device 300 schematically depicted in FIG. 4, the lift unit 304 is mechanically coupled to a carriage 306 which facilitates slidably positioning the lift unit 304 along rail 302. In the embodiments of the lift unit 304 described herein, the lift unit 304 includes a connection rail 318 which is mounted to the top surface of the lift unit 304. The connection rail 318 facilitates connecting and securing the lift unit 304 to the carriage 306. In the embodiment of the lift unit 304 shown in FIG. 4, the connection rail 318 has a T-shaped configuration and the carriage 306 has a receiving slot 342 with a complimentary configuration for receiving the connection rail 318. In some embodiments, the carriage 306 is secured to the connection rail 318 with a fastener 319, such as a bolt and nut as depicted in FIG. 4, which extends transversely through openings in the carriage 306 and a corresponding opening in the connection rail 318.

Figure 5:
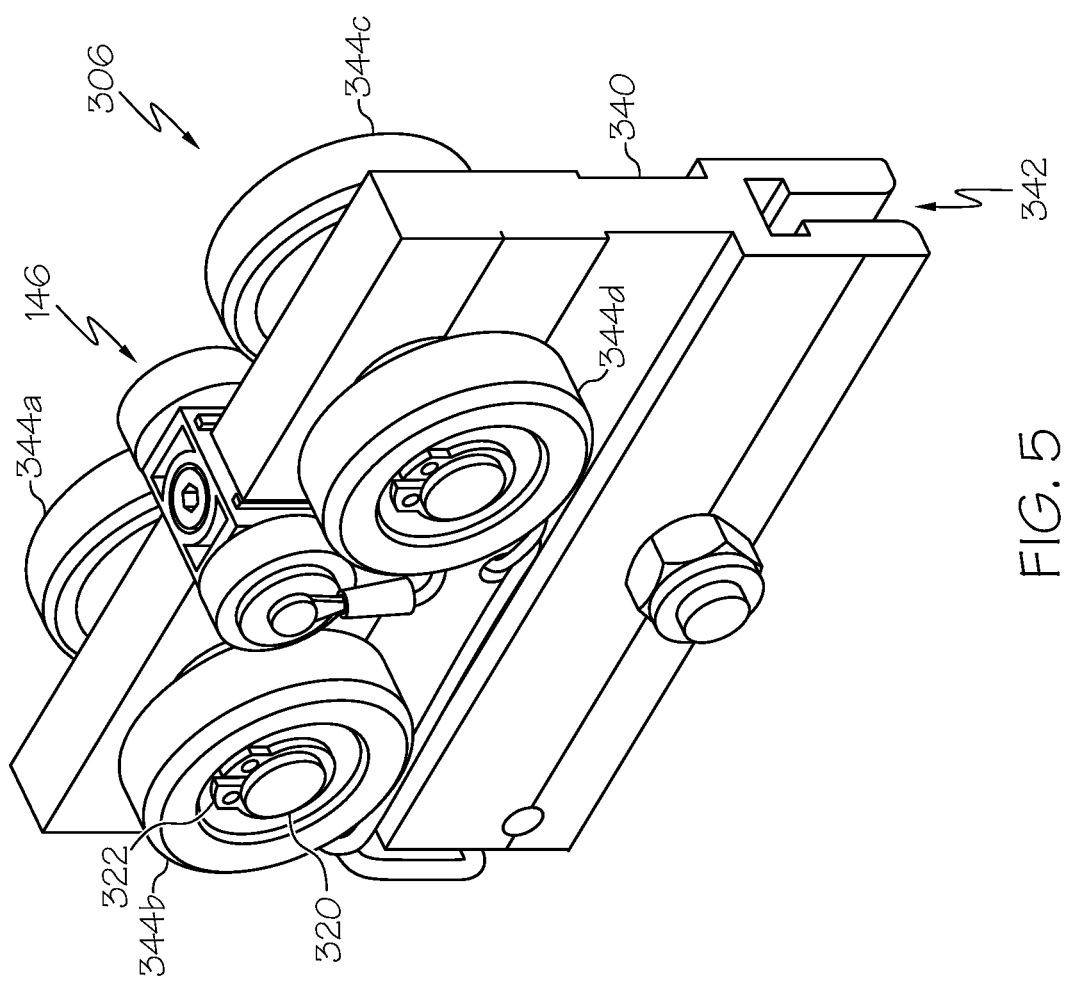
FIG. 5 schematically depicts a carriage of the overhead lift of FIGS. 3 and 4.

Referring now to FIG. 5, the carriage 306 generally comprises a carriage body 340 to which a plurality of support wheels 344a, 344b, 344c, and 344d are rotatably attached for supporting the carriage 306 in the rail. The support wheels 344a, 344b, 344c, and 344d facilitate positioning the carriage 306 and lift unit along the length of the rail. In the embodiments described herein, the carriage 306 is depicted with four support wheels. However, it is contemplated that the carriage 306 may be constructed with fewer than 4 support wheels. For example, in some embodiments, the carriage may be constructed with one or two support wheels (i.e., a pair of support wheels). Accordingly, it should be understood that the carriage 306 includes at least one support wheel. The support wheels 344a-d are positioned on axles 320 which extend transversely through the carriage body 340. Each support wheel is secured to the axle 320 with a fastener, such as retaining clips 322, such that the support wheels are rotatable on the axle 320.

In the embodiment of the carriage 306 depicted in FIG. 5, the support wheels 344a, 344b, 344c, and 344d are passive (i.e., the support wheels are not actively driven with a motor or a similar drive mechanism) and the lift unit is manually traversed along the rail. However, in alternative embodiments (not shown), the support wheels may be actively driven such as when the support wheels are coupled to a motor or a similar mechanism. In such embodiments, the drive mechanism may be communicatively coupled to an electronic control unit (such as electronic control unit 202 shown in FIG. 3) which actuates the drive mechanism and facilitates traversing the lift unit along the rail with the drive mechanism.

Figure 6:
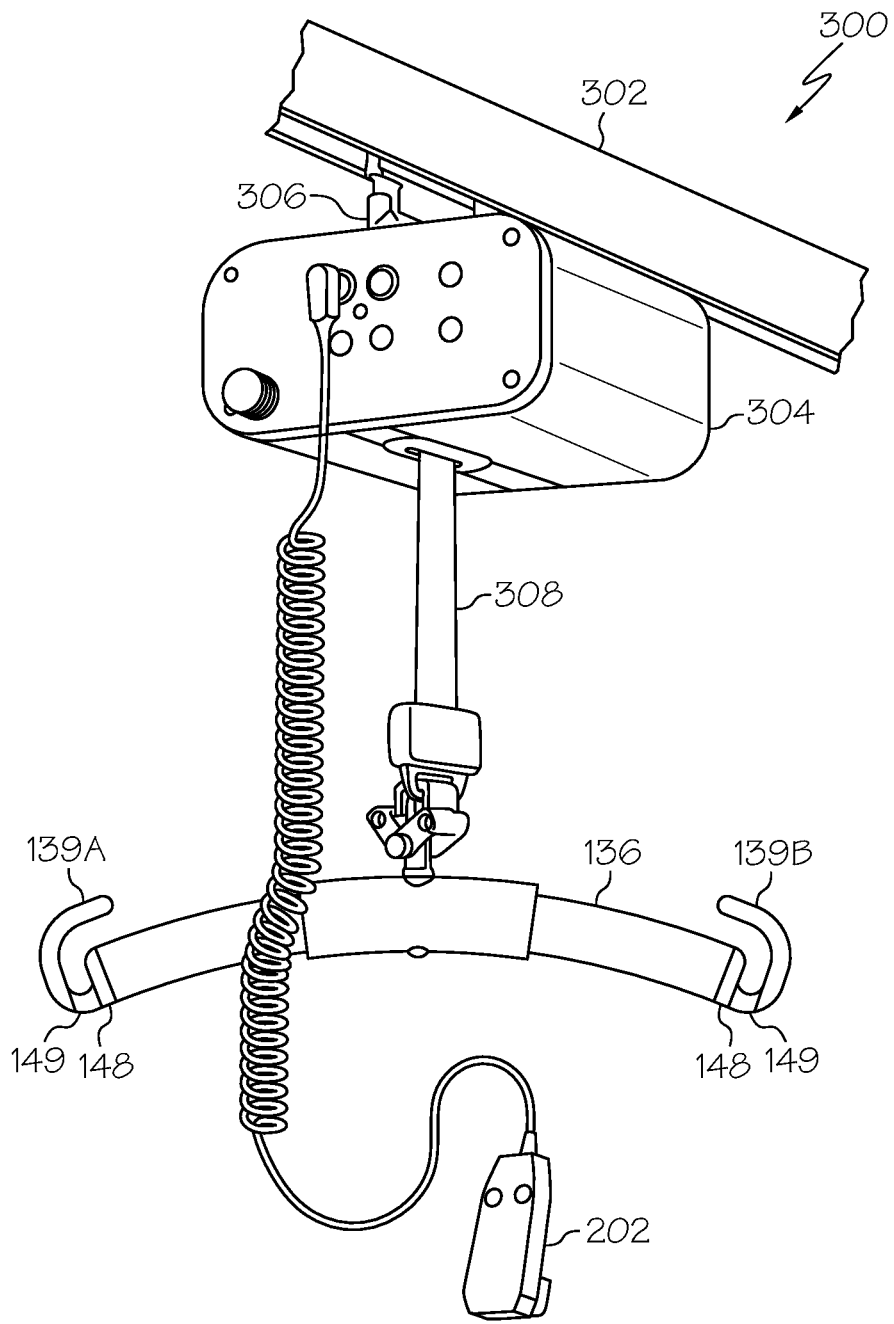
FIG. 6 schematically depicts a perspective view of an overhead lift according to another embodiment shown and described herein.

Referring to FIG. 3, in some embodiments, the multi-link device 148 is disposed at a different location of the person lifting device 300 than a joint of the lifting strap and the sling bar 136. The multi-link device 148 may be disposed in any location where a load is applied to the load tension pin 149 of the multi-link device 148 in response to lifting operations. For example, as shown in FIG. 6, two multi-link devices 148 may be disposed between the sling bar 136 and the lifting hooks 139A and 139B. When the person lifting device 300 lifts a patient sitting on a sling attached to the sling bar 136, a load is applied to the load tension pins 149. In some embodiment, only one multi-link device 148 is disposed between the sling bar 136 and the lifting hook 139A or 139B. As another example, the multi-link device 148 is disposed at a joint between the rail 302 and the lift unit 304. In some embodiments, the multi-link 148 may be disposed at any other location on a load path, for example, at the axle 320 on the carriage 306, at the bolt on the carriage 306 or the lift unit 304, at the bolt on the lift arm 106, at the lift arm pivot 138, at the actuator pivot 140, at the attachment pivot 142, etc.

Figure 7:
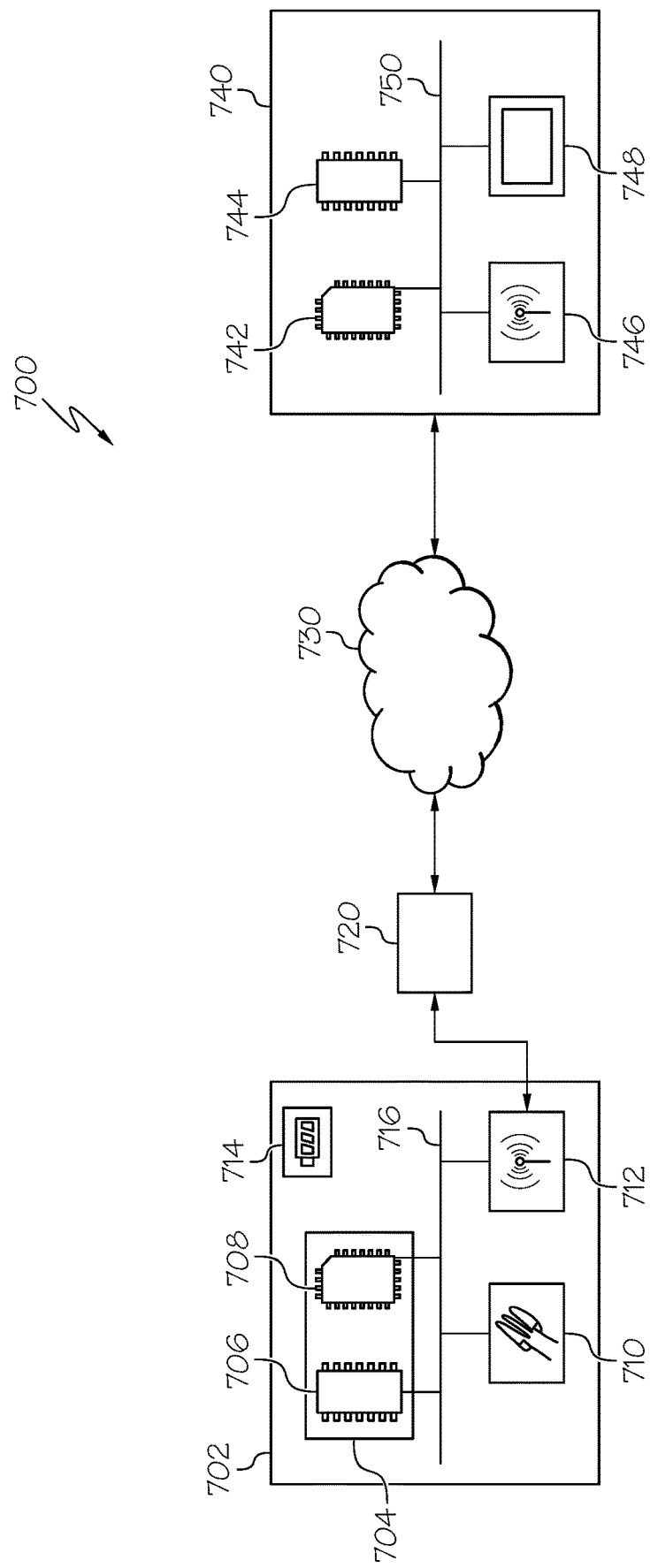
FIG. 7 schematically depicts an exemplary embodiment of a lift data management system including a multi-link device for providing load data to a central server in accordance with one or more embodiments shown and described herein.

FIG. 7 schematically depicts an exemplary embodiment of a lift data management system 700 including a multi-link device 702 for providing load data to a server 740 in accordance with one or more embodiments shown and described herein. The multi-link device 702 may correspond to the multi-link device 148 in FIG. 1 or the multi-link device 148 in FIG. 3. The multi-link device 702 includes a controller 704, one or more sensors 710, network interface hardware 712, a power source 714, and a communication path 716. The various components of the multi-link device 702 will now be described.

The controller 704 includes one or more processors 706 and one or more memory modules 708 to which various components are communicatively coupled, as will be described in further detail below. In some embodiments, the one or more processors 706 and the one or more memory modules 708 and/or the other components are included within a single device. In other embodiments, the one or more processors 706, the one or more memory modules 708 and/or the other components are distributed among multiple devices that are communicatively coupled.

The controller 704 includes the one or more memory modules 708 that store a set of machine readable instructions. The one or more processors 706 execute the machine readable instructions stored in the one or more memory modules 708. The one or more memory modules 708 may comprise RAM, ROM, flash memories, hard drives, or any device capable of storing machine readable instructions such that the machine readable instructions can be accessed by the one or more processors 706. The machine readable instructions comprise logic or algorithm(s) written in any programming language of any generation (e.g., 1GL, 2GL, 3GL, 4GL, or 5GL) such as, for example, machine language that may be directly executed by the one or more processors 706, or assembly language, object-oriented programming (OOP), scripting languages, microcode, etc., that may be compiled or assembled into machine readable instructions and stored in the one or more memory modules 708. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The one or more memory modules 708 may be implemented as one memory module or a plurality of memory modules.

The one or more memory modules 708 include instructions for executing the functions of the multi-link device 702. The instructions may include instructions for determining whether a tension measured by the one or more sensors 710 becomes greater or less than a threshold value, instructions for determining whether a tension measure by the one or more sensors 710 is increased or decreased, and/or instructions for transmitting signal to a receiver 720. The one or more sensors 710 may be strain gauges included within the load tension pin 149 in FIG. 1 or 3. In some embodiments, if it is determined that the tension measured by the one or more sensors 710 becomes greater than a threshold value, the controller 704 instructs the network interface hardware 712 to send to the receiver 720 load event data indicating that an object is loaded on the multi-link device 702. For example, the network interface hardware 712 transmits load event data (e.g., a binary code of one) to the receiver 720 when it is determined that the tension measured by the one or more sensors 710 becomes greater than a threshold value. The network interface hardware 712 transmits unload event data (e.g., a binary code of zero) to the receiver 720 when it is determined that the tension measured by the one or more sensors 710 becomes less than the threshold value. The one or more memory modules 708 may store the load event data and the unload event data along with the time of the events occurred.

In some embodiments, if it is determined that the tension measured by the one or more sensors 710 is increased by a certain amount, the controller 704 instructs the network interface hardware 712 to send to the receiver 720 load event data indicating that an object is loaded on the multi-link device 702. If it is determined that the tension measured by the one or more sensors 710 is decreased by a certain amount, the controller 704 instructs the network interface hardware 712 to send to the receiver 720 unload event data indicating that an object is unloaded from the multi-link device 702. For example, the network interface hardware 712 transmits a binary code of one to the receiver 720 when it is determined that the tension measured by the one or more sensors 710 is increased by a certain amount. The network interface hardware 712 transmits a binary code of zero to the receiver 720 when it is determined that the tension measured by the one or more sensors 710 is decreased by the certain amount.

The one or more processors 706 may be any device capable of executing machine readable instructions. For example, the one or more processors 706 may be an integrated circuit, a microchip, a computer, or any other computing device. The one or more memory modules 708 and the one or more processors 706 are coupled to a communication path 716 that provides signal interconnectivity between various components and/or modules of the multi-link device 702. Accordingly, the communication path 716 may communicatively couple any number of processors with one another, and allow the modules coupled to the communication path 716 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 716 may be formed from any medium that is capable of transmitting a signal such as, for example, conductive wires, conductive traces, optical waveguides, or the like. Moreover, the communication path 716 may be formed from a combination of mediums capable of transmitting signals. In some embodiments, the communication path 716 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

As schematically depicted in FIG. 7, the communication path 716 communicatively couples the one or more processors 706 and one or more memory modules 708 with a plurality of other components of the multi-link device 702. For example, the multi-link device 702 depicted in FIG. 7 includes the one or more processors 706 and the one or more memory modules 708 communicatively coupled with the one or more one or more sensors 710, and the network interface hardware 712.

The one or more sensors 710 may be one or more strain gauges that measures strain applied to the multi-link device 702. For example, the one or more sensors 710 may be one or more strain gauges included within the load tension pin 149. When an electrical conductor of the strain gauge is stretched within the limits of its elasticity, the electrical conductor will become narrower and longer and increase its electrical resistance end-to-end. In contrast, when the electrical conductor of the strain gauge is compressed, the electrical conductor will broaden and shorten and decrease its electrical resistance end-to-end. From the measured electrical resistance of the strain gauge, the amount of induced strain may be inferred. The detailed operations of the strain gauge will be described with reference to FIGS. 10A, 10B, and 11 below.

The multi-link device 702 includes network interface hardware 712 for communicatively coupling the multi-link device 702 to the receiver 720. The network interface hardware 712 can be communicatively coupled to the communication path 716 and can be any device capable of transmitting and/or receiving data to and from the receiver 720. Accordingly, the network interface hardware 712 can include a communication transceiver for sending and/or receiving any wired or wireless communication. For example, the network interface hardware 712 may include an antenna, a modem, LAN port, Wi-Fi card, WiMax card, an RFID transmitter, mobile communications hardware, near-field communication hardware, satellite communication hardware and/or any wired or wireless hardware for communicating with other networks and/or devices. In one embodiment, the network interface hardware 712 includes hardware configured to operate in accordance with the Bluetooth wireless communication protocol.

The multi-link device 702 includes the power source 714 which is housed in the multi-link device 702 and electrically coupled to the components of the multi-link device 702 thereby providing power to the components of the multi-link device 702. However, it should be understood that, in other embodiments, the multi-link device 702 may be constructed without the power source, such as when the multi-link device 702 is directly wired to an external power source.

While FIG. 7 depicts the one or more processors 706, the one or more memory modules 708, and the one or more sensors 710, it should be understood that one or more of these components may be distributed among multiple devices in a variety of configurations.

The receiver 720 may be communicatively coupled to the server 740 by a network 730. In embodiments, the receiver 720 includes one or more processors similar to the one or more processors 706, one or more memory modules similar to the one or more memory modules 708, and network interface hardware similar to the network interface hardware 712. The one or memory modules of the receiver 720 may include location information about the receiver 720 and/or the multi-link device 702.

In one embodiment, the network 730 may include one or more computer networks (e.g., a personal area network, a local area network, or a wide area network), cellular networks, satellite networks and/or a global positioning system and combinations thereof. Accordingly, the receiver 720 can be communicatively coupled to the network 730 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable cellular networks include, but are not limited to, technologies such as LTE, WiMAX, UMTS, CDMA, and GSM. In some embodiments, the lift data management system 700 may not include the receiver 720 and the multi-link device 702 may be communicatively coupled to the server 740 by the network 730.

The server 740 may include one or more processors 742, one or more memory modules 744, a network interface hardware 746, a display 748, and a communication path 750. The one or more processors 742 may be processors similar to the one or more processors 706 described above. The one or more memory modules 744 may be memories similar to the one or more memory modules 708 described above. The network interface hardware 746 may be interface hardware similar to the network interface hardware 712 described above. The communication path 750 may be a communication path similar to the communication path 716 described above. The display 748 may include any medium capable of transmitting an optical output such as, for example, a cathode ray tube, a light emitting diode (LED) display, an organic light emitting diode (OLED) display, a liquid crystal display, a plasma display, or the like.

The one or more processors 742 can execute logic to communicate with the multi-link device 702 and/or the receiver 720. The server 740 may be configured with wired and/or wireless communication functionality for communicating with the multi-link device 702. In some embodiments, the server 740 may perform one or more elements of the functionality described herein, such as in embodiments in which the functionality described herein is distributed between the multi-link device 702 and the server 740. In some embodiments, the server 740 may provide a user interface through which one or more settings or configurations of the multi-link device 702 may be altered.

In embodiments, the multi-link device 702 transmits load event data or unload event data to the server 740. For example, the multi-link device 702 detects a load event or unload event using the one or more sensors 710, and transmits the load event data or unload event data to the receiver 720. The receiver 720 relays the received load event data or unload event data to the server 740 through the network 730. In some embodiments, the multi-link device 702 communicates directly with the receiver 720 through the network 730. For example, when the multi-link device 702 detects a load event or unload event by the one or more sensors 710, it transmits the load event data or unload event data to the server 740 through the network 730 without transmitting the data to the receiver 720.

Figure 8:
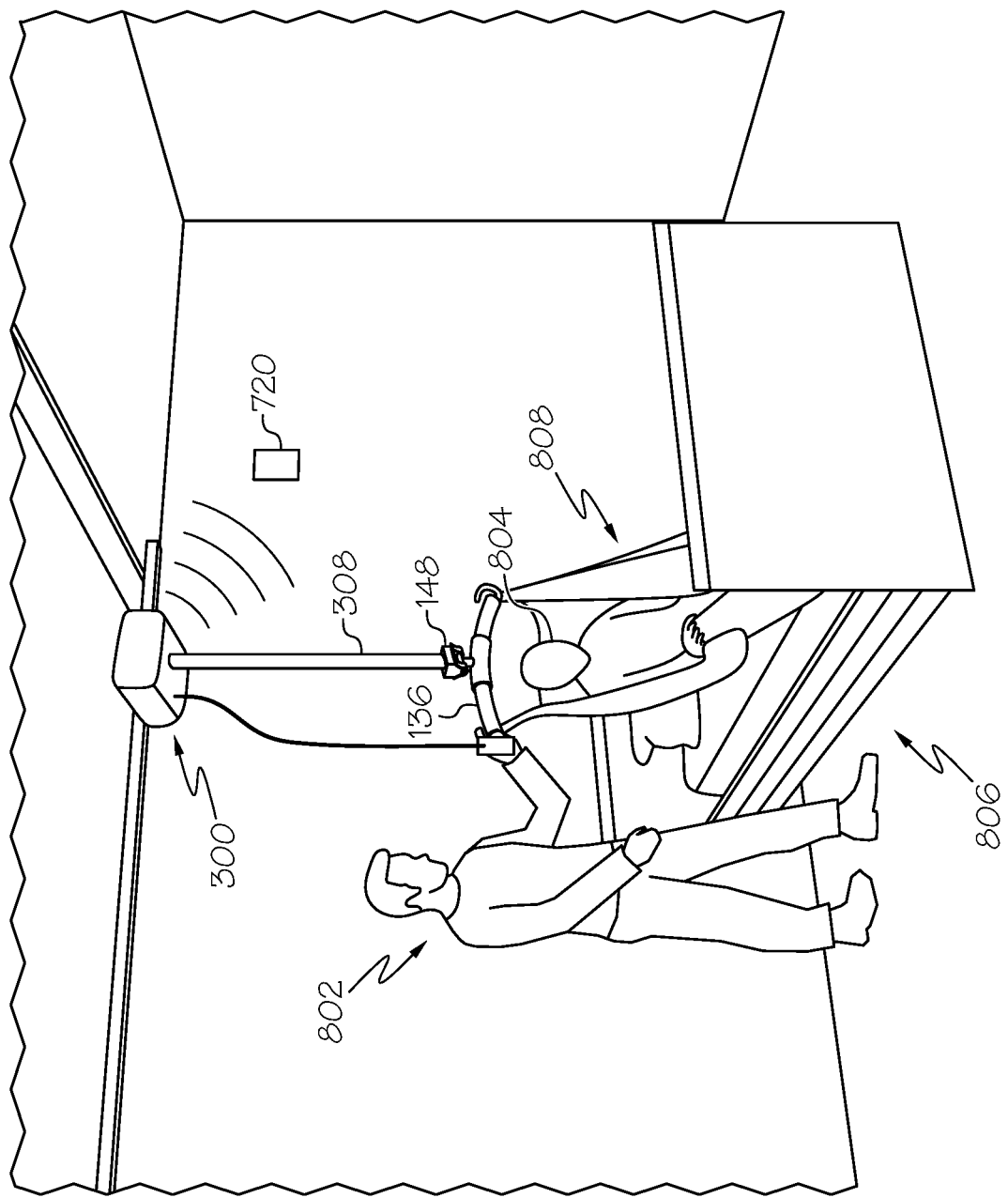
FIG. 8 depicts a perspective view of an operator lifting a patient using the person lift system in accordance with one or more embodiments shown and described herein.

FIG. 8 depicts a perspective view of an operator 802 lifting a patient 804 using the person lifting device 300 in accordance with one or more embodiments shown and described herein. In FIG. 8, a sling 808 is hung on the sling bar 136 of the person lifting device 300 and the patient 804 sits on the sling 808. The operator 802 may be a caregiver, a nurse, or a technician testing or fixing the person lifting device 300. The operator 802 may manipulate the electronic control unit 202 to heighten or lower the sling bar 136 in order to lift or lower the patient 804. When the sling 808 is lifted such that the patient 804 is lifted off of a patient support system 806, a tension is applied to the load tension pin 149 (see FIG. 3) of the multi-link device 148.

In some embodiments, the multi-link device 148 determines whether the tension becomes greater or less than a threshold value. The multi-link device 148 transmits load event data to the receiver 720 if it is determined that the tension becomes greater than the threshold value. For example, in some embodiments, the multi-link device 148 may transmit a binary code of one to the receiver 720 when it is determined that the tension becomes greater than the threshold value. The multi-link device 148 transmits unload event data to the receiver 720 if it is determined that the tension becomes less than the threshold value. For example, the multi-link device 148 may transmit a binary code of zero to the receiver 720 when it is determined that the tension becomes less than the threshold value. As for another example, the multi-link device 148 may transmit one type of data if it is determined that the tension becomes greater than the threshold value, and transmit another type of data if it is determined that the tension becomes less than the threshold value.

In some embodiments, if it is determined that the tension applied to the load tension pin is increased by a certain amount, the multi-link device 148 transmits to the receiver 720 load event data indicating that an object is loaded on the multi-link device 148. If it is determined that the tension applied to the load tension pin is decreased by a certain amount, the multi-link device 148 transmits to the receiver 720 unload event data indicating that an object is unloaded from the multi-link device 148. For example, the multi-link device 148 transmits a binary code of one to the receiver 720 when it is determined that the tension measured by the multi-link device 148 is increased by a certain amount. The multi-link device 148 transmits a binary code of zero to the receiver 720 when it is determined that the tension measured by the multi-link device 148 is decreased by a certain amount. Although FIG. 8 illustrates the person lifting device 300 shown in FIG. 3, the mobile person lifting device 100 in FIG. 1 may be used to lift the patient 804.

In some embodiments, the multi-link device 148 may transmit identification information about the person lifting device 300 to the receiver 720 along with load event data or unload event data. For example, the multi-link device 148 receives identification information of the person lifting device 300 from the electronic control unit 202, and stores the identification number of the person lifting device 300 in the one or more memory modules 708. When there is a change in the tension applied to the multi-link device 148, the multi-link device 148 transmits load event data or unload event data along with the identification information.

In some embodiments, the multi-link device 148 also transmits location information to the receiver 720. For example, the multi-link device 148 receives the location information of the person lifting device 300 from the electronic control unit 202, and stores the location information of the person lifting device 300 in the one or more memory modules 708. When the load applied to the multi-link device 148 is changed, the multi-link device 148 transmits load event data or unload event data along with the identification number. In another embodiment, the receiver 720 may store location information, e.g., a room number where the person lifting device 300 or the receiver 720 is located.

As described with reference to FIG. 7, the receiver 720 transmits load event data or unload event data, the identification, and/or the location information to the server 740 via the network 730. In this regard, the server 740 may receive information about where the person lifting device 300 is used and how many times the person lifting device 300 is used.

Figure 9B:
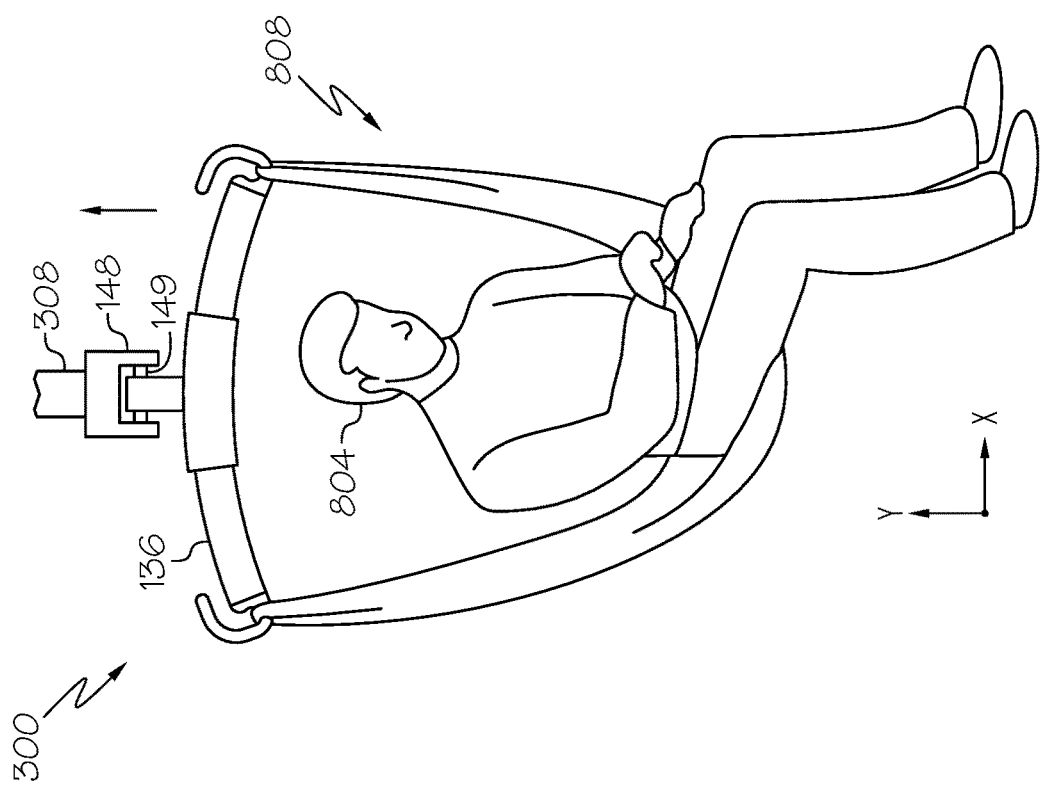
FIG. 9B depicts the person lift system lifting a patient in accordance with one or more embodiments shown and described herein.
Figure 9A:
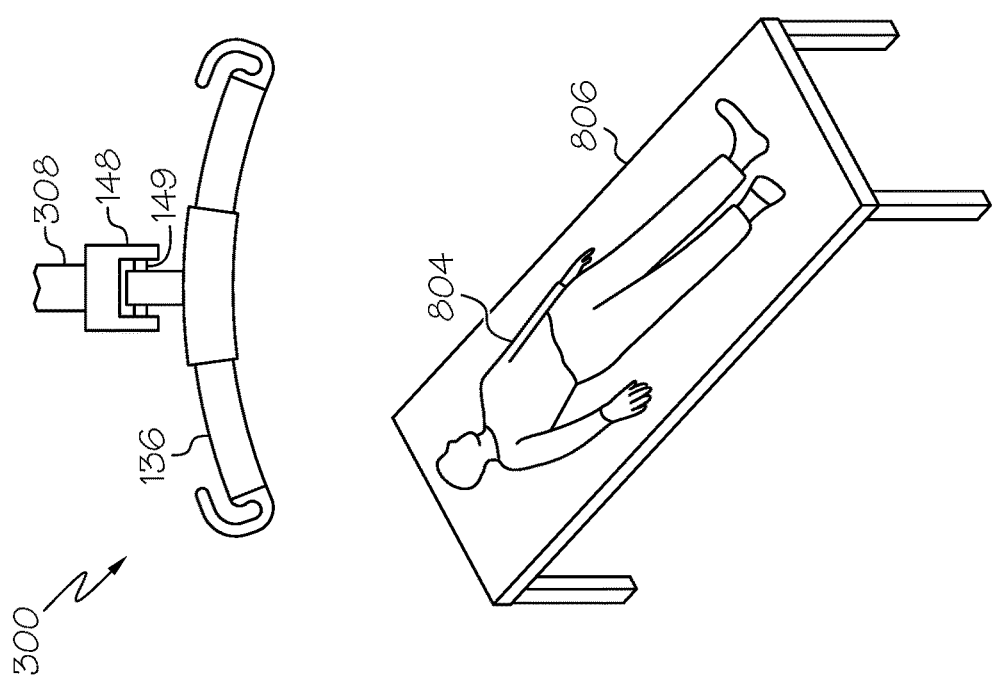
FIG. 9A depicts the person lift system lifting a patient in accordance with one or more embodiments shown and described herein.

FIGS. 9A and 9B depict the person lifting device 300 lifting a patient in accordance with one or more embodiments shown and described herein. In FIG. 9A, no object is hung on the sling bar 136. As another example, a sling may be hung on the sling bar 136 without a patient sitting on the sling. Thus, only the weight of the sling bar 136 and optionally the sling 808 is applied the load tension pin 149. The load applied by the sling bar 136 and the sling 808 may be set as a default load by the multi-link device 148.

Figure 10A:
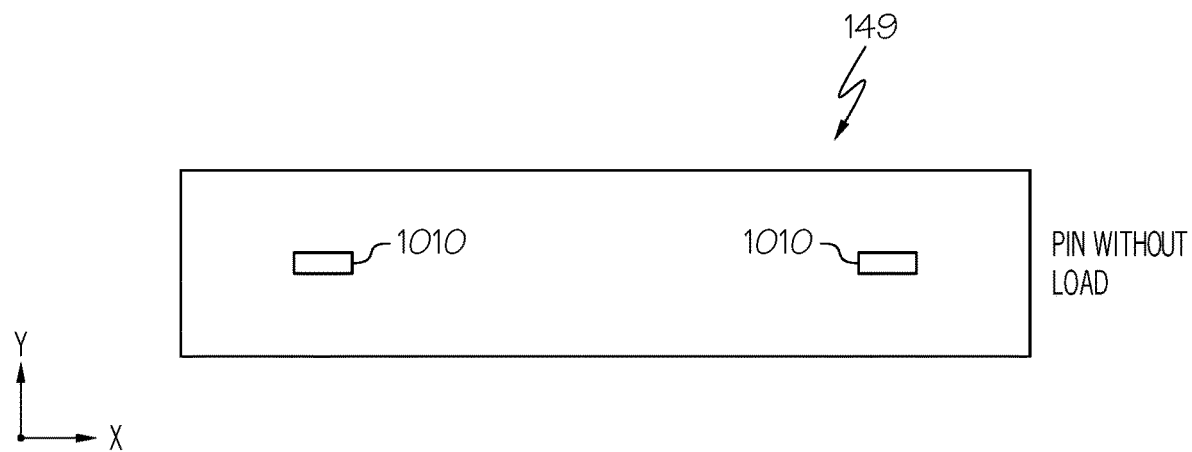
FIG. 10A depicts the load tension pin of the multi-link device when no object is hung on the sling bar or no object is placed on a sling attached to the load tension pin.

FIG. 10A depicts the load tension pin 149 of the multi-link device 148 when no object is hung on the sling bar 136 or no object is placed on the sling 808, as shown in FIG. 9A.

The load tension pin 149 may include one or more strain gauges. For example, in FIG. 10A, the load tension pin 149 includes two strain gauges 1010. When no object is hung on the sling bar 136 or no object is placed on the sling 808, the load tension pin 149 is not substantially deformed. Accordingly, the strain gauges 1010 are also not substantially deformed.

Figure 10B:
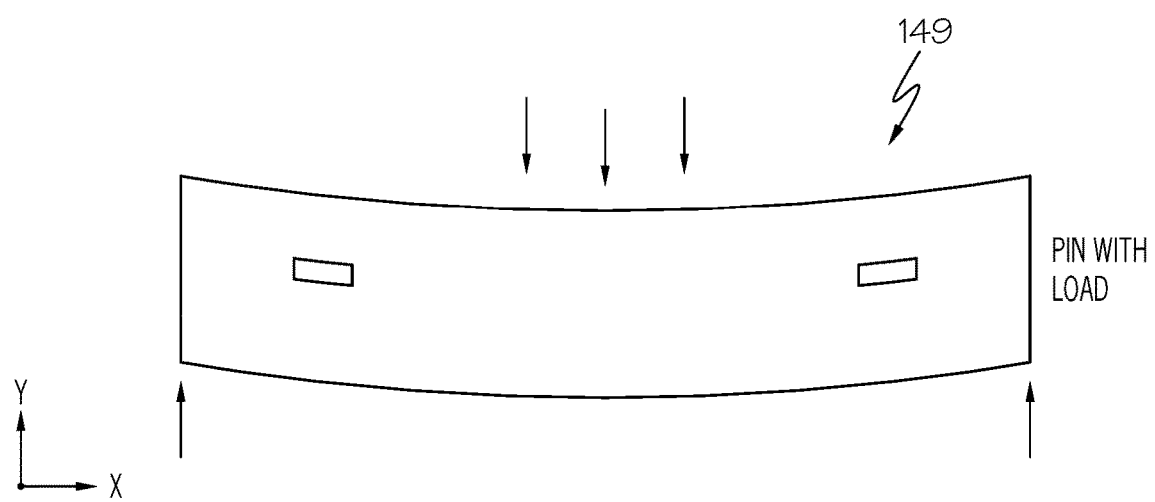
FIG. 10B depicts the load tension pin of the multi-link device when an object is hung on the sling bar or an object is placed on the sling attached to the load tension pin.

Referring now back to FIG. 9B, the patient 804 sits on the sling 808 that is hung on the sling bar 136. The person lifting device 300 lifts the patient 804 by lifting the multi-link device 148 using the lifting strap 308. When the patient 804 is lifted off a patient support system, e.g., a patient bed, the weight of the patient 804 is applied to the load tension pin 149. FIG. 10B depicts the load tension pin 149 when the patient 804 sitting on the sling 808 is lifted off as shown in FIG. 9B. The load tension pin 149 is deformed in −y direction by the tension applied by the weight of the patient. Particularly, the center of the load tension pin 149 is deformed in −y direction, whereas both sides of the load tension pin 149 are fixed. Accordingly, the strain gauges 1010 are also deformed in a similar way as the load tension pin 149. Based on the degree of deformation of the strain gauges 1010, the load tension pin 149 measures the tension applied to the load tension pin 149. Specifically, when electrical conductors of the strain gauges 1010 are stretched within the limits of its elasticity, the electrical conductor becomes narrower and longer and increases its electrical resistance end-to-end. When the electrical conductors of the strain gauges 1010 are compressed, the electrical conductor broadens and shortens and decreases its electrical resistance end-to-end. Based on the measured electrical resistance of the strain gauges 1010, the amount of induced tension may be inferred.

Figure 11:
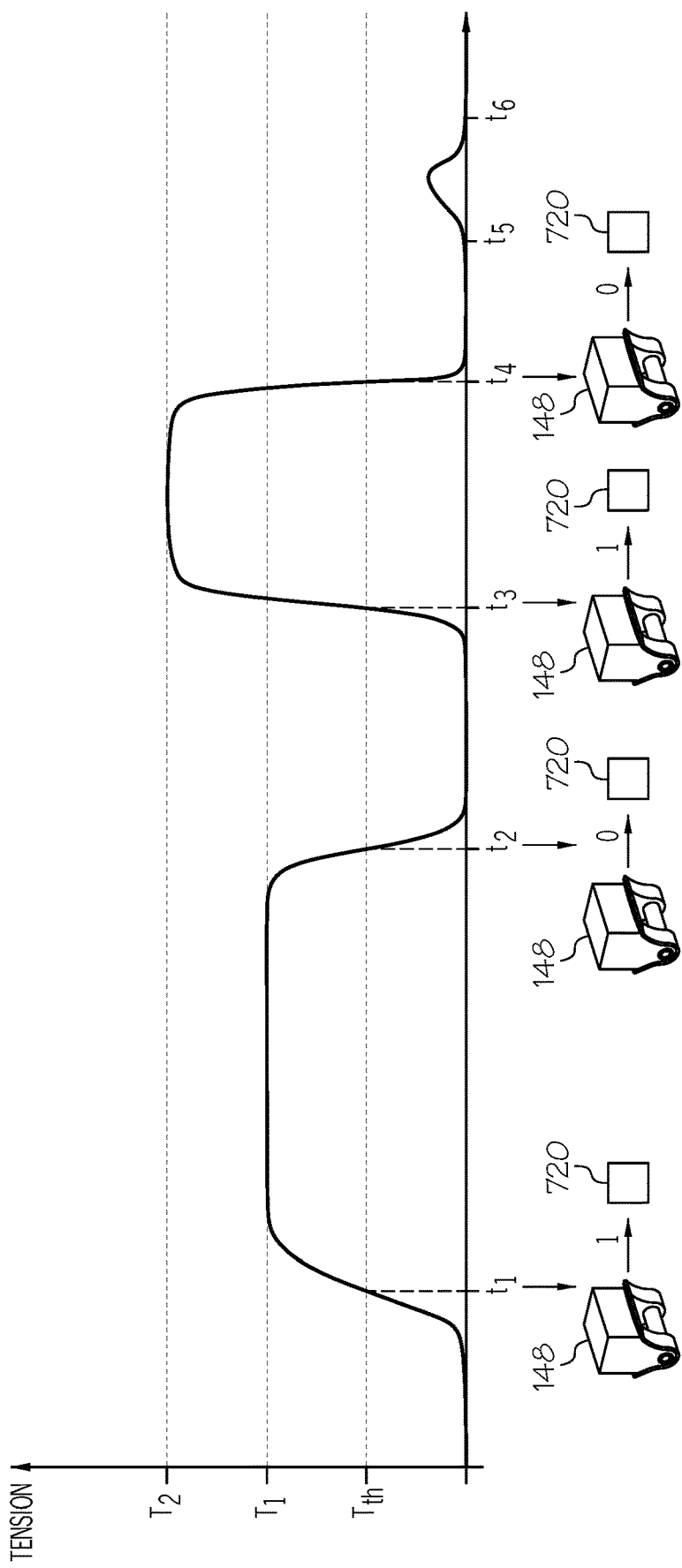
FIG. 11 depicts an exemplary graph showing changes of the tension applied to the load tension pin in accordance with one or more embodiments shown and described herein.

FIG. 11 depicts an exemplary graph showing changes of the tension applied to the load tension pin 149 in accordance with one or more embodiments shown and described herein. Prior to time $t_1$, the tension applied to the load tension pin 149 starts increasing, e.g., by lifting a patient using the person lifting device 300. At time $t_1$, the tension applied to the load tension pin 149 exceeds the threshold value $T_{th}$. The controller 704 of the multi-link device 148 determines that the tension measured by the load tension pin 149 becomes greater than the threshold value $T_{th}$, and sends load event data to receiver 720 indicating that the load tension pin 149 is loaded, e.g., a binary code of one. The multi-link device 148 may send the load event data to the server 740 through the network 730 without communicating with the receiver 720. In another embodiment, the controller 704 of the multi-link device 148 determines that the tension measured by the load tension pin 149 is increased by a certain amount, and sends load event data to receiver 720 indicating that the load tension pin 149 is loaded.

Prior to time $t_2$, the tension applied to the load tension pin 149 starts decreasing when the person lifting device 300 puts the patient down on a patient support system. At time $t_2$, the tension applied to the load tension pin 149 becomes less than the threshold value $T_{th}$. The controller 704 of the multi-link device 148 determines that the tension measured by the load tension pin 149 becomes less than the threshold value $T_{th}$, and sends unload event data to receiver 720 indicating that the load tension pin 149 is unloaded, e.g., a binary code of zero. In another embodiment, the controller 704 of the multi-link device 148 determines that the tension measured by the load tension pin 149 is decreased by a certain amount, and sends unload event data to the receiver 720 indicating that the load tension pin 149 is unloaded. That is, the multi-link device 148 sends two types of data: load event data indicating that the load tension pin 149 is loaded, and unload event data indicating that the load tension pin 149 is unloaded. In another embodiment, the multi-link device 148 sends only load event data indicating that the load tension pin 149 is loaded, and does not send unload event data indicating that the load tension pin 149 is unloaded.

Prior to time $t_3$, the tension applied to the load tension pin 149 again starts increasing, e.g., by lifting another patient using the person lifting device 300. At time $t_3$, the tension applied to the load tension pin 149 exceeds the threshold value $T_{th}$. The controller 704 of the multi-link device 148 determines that the tension measured by the load tension pin 149 becomes greater than the threshold value $T_{th}$, and sends another load event to receiver 720 indicating that the load tension pin 149 is loaded, e.g., a binary code of one. The multi-link device 148 may send the load event data to the server 740 through the network 730 without communicating with the receiver 720. In another embodiment, the controller 704 of the multi-link device 148 determines that the tension measured by the load tension pin 149 is increased by a certain amount, and sends load event data to receiver 720 indicating that the load tension pin 149 is loaded.

Prior to time $t_4$, the tension applied to the load tension pin 149 starts decreasing when the person lifting device 300 puts down the patient on, e.g., a patient support system. At time $t_4$, the tension applied to the load tension pin 149 becomes less than the threshold value $T_{th}$. The controller 704 of the multi-link device 148 determines that the tension measured by the load tension pin 149 becomes less than the threshold value $T_{th}$, and sends a wireless signal to receiver 720 indicating that the load tension pin 149 is unloaded, e.g., a signal of binary code 0. In another embodiment, the controller 704 of the multi-link device 148 determines that the tension measured by the load tension pin 149 is decreased by a certain amount, and sends unload event data to receiver 720 indicating that the load tension pin 149 is unloaded.

Between $t_5$ and $t_6$, the tension applied to the load tension pin 149 increases and decreases. However, the maximum of the tension between $t_5$ and $t_6$ does not exceed the threshold value $T_{th}$. Accordingly, the multi-link device 148 does not send load event data or unload event data. In this regard, the multi-link device 148 sends load event data or unload event data only when a significant change of the tension applied to the load tension pin 149 occurs.

FIG. 12 depicts collecting load information from a plurality of multi-link devices and a plurality of receivers in accordance with one or more embodiments shown and described herein. The person lifting devices 300a, 300b, 300c, 300d, and 300e are present at rooms of a hospital or any other facilities. For example, the person lifting device 300a is located at Room A and communicates with a receiver 720a that is also located within Room A. Similarly, the person lifting device 300b is located at Room B and communicates with a receiver 720b that is located in Room B, the person lifting device 300c is located at Room C and communicates with a receiver 720c that is located in Room C, the person lifting device 300d is located at Room D and communicates with a receiver 720d that is located in Room D, and person lifting device 300e is located at Room E and communicates with a receiver 720e that is located in Room E. The person lifting devices 300a, 300b, 300c, 300d, and 300e may be either the person lifting device 100 in FIG. 1 or the person lifting device 300 in FIG. 3, or a combination of the two. The person lifting devices 300a, 300b, 300c, 300d, and 300e include multi-link devices 148a, 148b, 148c, 148d, and 148e, and load tension pins 149a, 149b, 149c, 149d, and 149e, respectively. Although FIG. 12 illustrates five person lift systems, more than or less than five lift systems may communicate with the server 740.

Each of the load tension pins 149*a*, 149*b*, 149*c*, 149*d*, and 149*e* detects load events or unload events and transmits load event data or unload event data to the receivers 720*a*, 720*b*, 720*c*, 720*d*, and 720*e*, respectively. Each of the load tension pins 149*a*, 149*b*, 149*c*, 149*d*, and 149*e* may also communicate identification information about the person lifting devices 300*a*, 300*b*, 300*c*, 300*d*, and 300*e* to the receivers 720*a*, 720*b*, 720*c*, 720*d*, and 720*e*, respectively. The receivers 720*a*, 720*b*, 720*c*, 720*d*, and 720*e*, in turn, transmit the load event data or unload event data and/or the identification information to the server 740 through the network 730. The receivers 720*a*, 720*b*, 720*c*, 720*d*, and 720*e* may also transmit the locations of the receivers 720*a*, 720*b*, 720*c*, 720*d*, and 720*e* or the load tension pins 149*a*, 149*b*, 149*c*, 149*d*, and 149*e* to the server 740 through the network 730.

The server 740 receives the load information, identification information, and/or the location information from the receivers 720*a*, 720*b*, 720*c*, 720*d*, and 720*e* or the load tension pins 149*a*, 149*b*, 149*c*, 149*d*, and 149*e*, and stores the information in a database as illustrated in Table 1 below.

TABLE 1

| Device ID | Location | Event | Time |
|---|---|---|---|
| 300a | Room A | Load | 2:00 pm, May 1, 2017 |
| 300a | Room A | Unload | 2:01 pm, May 1, 2017 |
| 300b | Room B | Load | 2:10 pm, May 1, 2017 |
| 300b | Room B | Unload | 2:12 pm, May 1, 2017 |
| 300e | Room E | Load | 2:15 pm, May 1, 2017 |
| 300c | Room C | Load | 2:15 pm, May 1, 2017 |
| 300e | Room E | Unload | 2:18 pm, May 1, 2017 |
| 300c | Room C | Unload | 2:19 pm, May 1, 2017 |
| 300a | Room A | Load | 2:50 pm, May 1, 2017 |
| 300a | Room A | Unload | 2:52 pm, May 1, 2017 |

Table 1 shows exemplary load or unload events that occurred between 2 pm and 3 pm on May 1, 2017. The server 740 stores the events based on the information received from the receivers 720*a*, 720*b*, 720*c*, 720*d*, and 720*e* or the load tension pins 149*a*, 149*b*, 149*c*, 149*d*, and 149*e*. For example, at 2:00 pm, May 1, 2017, the server 740 receives load event data, e.g., a binary code of one, location information (Room A), and identification information about the person lifting device 300*a* from the receiver 720*a*. At 2:01 pm, May 1, 2017, the server 740 receives unload event data, e.g., a binary code of zero, location information (Room A), and identification information about the person lifting device 300*a*. At 2:50 pm, May 1, 2017, the server 740 receives load event data, location information (Room A), and identification information about the person lifting device 300*a* from the receiver 720*a*. At 2:52 pm, May 1, 2017, the server 740 receives unload event data, location information (Room A), and identification information about the person lifting device 300*a*. In some embodiments, the receivers 720*a*, 720*b*, 720*c*, 720*d*, and 720*e* store the timings of receiving load event data and/or unload event data, and transmit the timings to the receivers 720*a*, 720*b*, 720*c*, 720*d*, and 720*e*, respectively.

Based on the received information, the server 740 can determine how many times each of the person lifting devices 300*a*, 300*b*, 300*c*, 300*d*, and 300*e* is lifted, and how long the person lifting devices 300*a*, 300*b*, 300*c*, 300*d*, and 300*e* is lifted during a certain period of time. For example, between 2 pm and 3 pm on May 1, 2017, the person lifting device 300*a* is lifted two times, and the person lifting device 300*a* is lifted for three minutes (between 2:00 pm and 2:01 pm and between 2:50 pm and 2:52 pm).

The server 740 may also maintain an exemplary database as illustrated in Table 2 below.

TABLE 2

| Device ID | No. of Load Events | Total Usage Time | Time of First Lift |
|---|---|---|---|
| 300a | 3,164 | 4,587 minutes | January 2012 |
| 300b | 12 | 15 minutes | July 2016 |
| 300c | 3 | 5 minutes | March 2017 |
| 300d | 367 | 695 minutes | February 2017 |
| 300e | 893 | 1,234 minutes | June 2013 |

The database stores the device ID, the number of load events, total usage time, and the time of first lift. The server 740 updates the database whenever it receives information from the receivers 720*a*, 720*b*, 720*c*, 720*d*, and 720*e* or the load tension pins 149*a*, 149*b*, 149*c*, 149*d*, and 149*e*. For example, when the server 740 receives load event data from the receiver 720*a*, the server 740 increases the number of load events for the person lifting device 300*a* by one. When the server 740 receives unload event data from the receiver 720*a*, the server calculates usage time based on the time when the load event occurred and the time when the unload event occurred, and updates the total usage time. The updated database may be provided to a facility manager via output devices, for example, the display 748 of the server 740.

Based on the database, the server 740 may determine whether a certain person lift system should be replaced or repaired. For example, if the number of load events for a certain person lift system exceeds a threshold value, the server 740 may provide an alert to a facility manager that the person lift system should be replaced or repaired. In some embodiments, the server 740 may communicate the alert to the receivers 720*a*, 720*b*, 720*c*, 720*d*, and 720*e* or the load tension pins 149*a*, 149*b*, 149*c*, 149*d*, and 149*e* through the network 730. The receivers 720*a*, 720*b*, 720*c*, 720*d*, and 720*e* or the load tension pins 149*a*, 149*b*, 149*c*, 149*d*, and 149*e*, in turn, may communicate the alert to the electronic control unit 202 of the person lifting devices 300*a*, 300*b*, 300*c*, 300*d*, and 300*e*, respectively.

Based on the foregoing, it should be understood that a lift data management system includes a receiver, a person lifting device, and a central server. The person lifting device includes an actuator, a lift arm coupled to the actuator, one end of the lift arm being configured to move vertically by the actuator, and a multi-link device coupled to the one end of the lift arm and communicatively coupled to the receiver. The multi-link device includes a load tension pin including a sensor configured to measure tension applied to the load tension pin, network interface hardware, one or more processors, and one or more memory modules storing computer readable and executable instructions which, when executed by the processors, cause the multi-link device to: determine whether the tension is increased, and transmit, by the network interface hardware, load event data to the receiver in response to determination that the tension is increased. The central server receives the load event data from the receiver, and update usage information associated with the person lifting device based on the load event data.

By transmitting load or unload events associated with person lifting devices to a central server in real time, the multi-link devices allow centralized management of multiple person lifting devices distributed over many areas. The multi-link device also provide accurate and fast information about how many times and how long each of the person lift devices are used.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A multi-link device comprising:
a load tension pin including a sensor configured to measure tension applied to the load tension pin;
network interface hardware;
one or more processors; and
one or more memory modules storing computer readable and executable instructions which, when executed by the one or more processors, cause the multi-link device to:
determine whether the tension measured by the load tension pin exceeds a threshold value;
transmit, by the network interface hardware, a first binary code to a receiver in response to determination that the tension exceeds the threshold value; and
transmit, by the network interface hardware, a second binary code to the receiver in response to determination that the tension becomes less than the threshold value.

2. A person lift device comprising:
an actuator;
a lift arm coupled to the actuator, one end of the lift arm being configured to move vertically by the actuator;
a multi-link device coupled to the one end of the lift arm, the multi-link device comprising:
a load tension pin including a sensor configured to measure tension applied to the load tension pin;
network interface hardware;
one or more processors; and
one or more memory modules storing computer readable and executable instructions which, when executed by the one or more processors, cause the multi-link device to:
determine whether the tension measured by the load tension pin exceeds a threshold value; and
transmit, by the network interface hardware, load event data to a receiver in response to determination that the tension exceeds the threshold value; and
a bar attached to the load tension pin.

3. The person lift device of claim 2, wherein the load event data is a binary code.

4. The person lift device of claim 2, wherein the computer readable and executable instructions, when executed by the one or more processors, further cause the multi-link device to:
determine whether the tension measured by the load tension pin becomes less than the threshold value; and
transmit, by the network interface hardware, unload event data to the receiver in response to determination that the tension becomes less than the threshold value.

5. The person lift device of claim 2, wherein the one or more memory modules store a location of the multi-link device, and the multi-link device transmits the load event data along with the location to the receiver.

6. The person lift device of claim 2, wherein the sensor includes one or more strain gauges.

7. The person lift device of claim 2, wherein the network interface hardware is configured to communicate with the receiver via at least one of Wi-Fi, Bluetooth, and RFID communication.

* * * * *

UNITED STATES PATENT AND TRADEMARK OFFICE
CERTIFICATE OF CORRECTION

| | |
|---|---|
| PATENT NO. | : 11,654,069 B2 |
| APPLICATION NO. | : 17/374126 |
| DATED | : May 23, 2023 |
| INVENTOR(S) | : Andreas Bolin |

It is certified that error appears in the above-identified patent and that said Letters Patent is hereby corrected as shown below:

On the Title Page

Column 1, (72), after Inventor: Andreas Bolin, delete "Gammmelstad (SE)" and insert -- Gammelstad (SE) --, therefor.

Signed and Sealed this
Twelfth Day of September, 2023

*Katherine Kelly Vidal*

Katherine Kelly Vidal
*Director of the United States Patent and Trademark Office*